Figure 1:
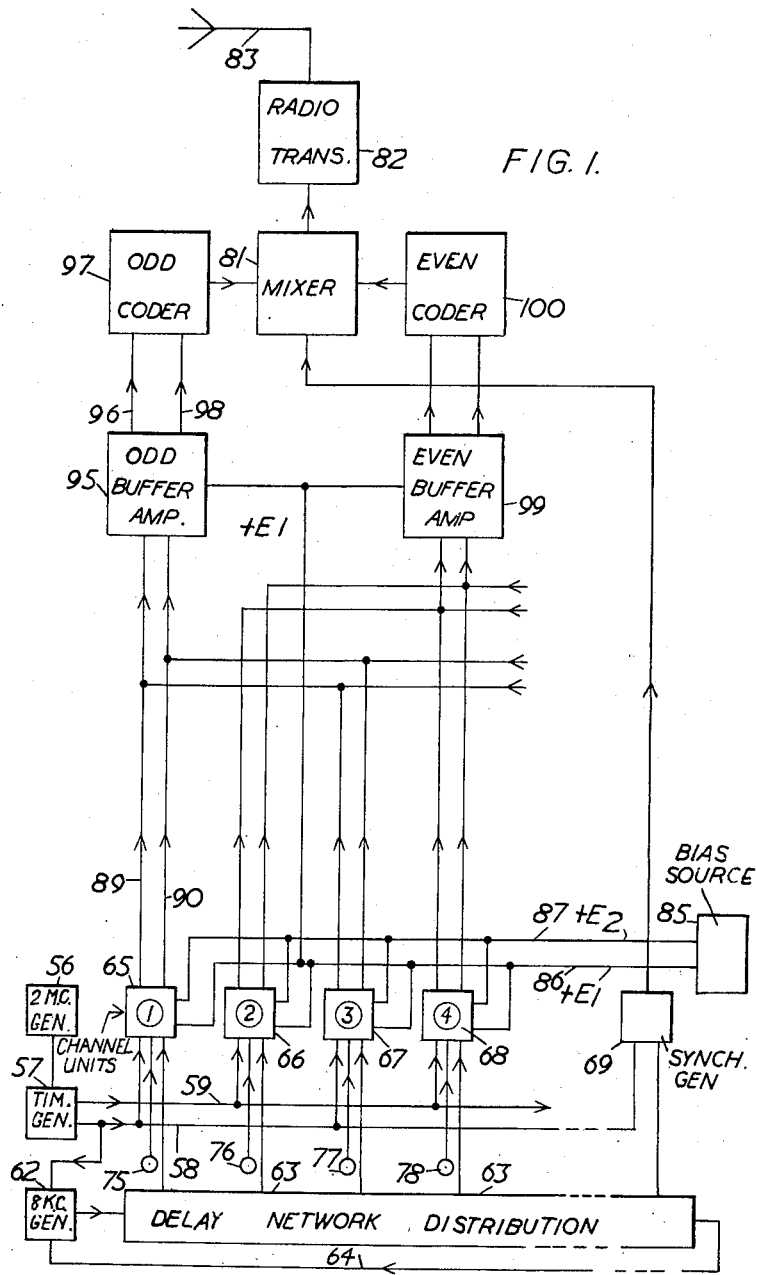

Inventor
C. G. TREADWELL
By R.P. Morris
Attorney

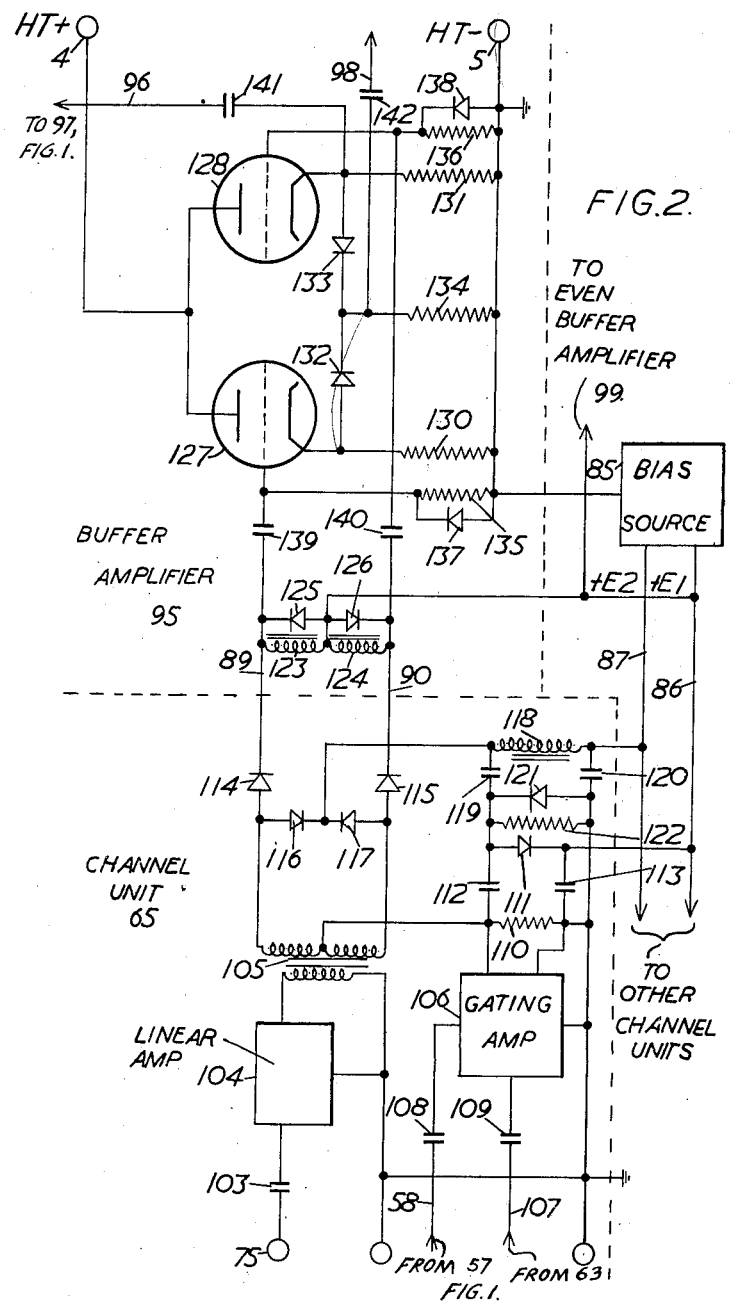

United States Patent Office 2,985,834
Patented May 23, 1961

2,985,834
AMPLITUDE SAMPLING ARRANGEMENT FOR PULSE CODE MODULATION

Cyril Gordon Treadwell, London, England, assignor to International Standard Electric Corporation, New York, N.Y., a corporation of Delaware Filed June 6, 1955, Ser. No. 513,406

Claims priority, application Great Britain July 12, 1954

8 Claims. (Cl. 328—31)

The present invention relates to improved sampling arrangements for electric pulse code modulation systems of communication.

When such systems are applied to the transmission of speech or music, the signal waves to be coded have amplitudes which vary over equal ranges of positive and negative values, and in order to simplify the coding of the signal wave samples, it has already been proposed to code the magnitude of each sample irrespective of its sign, and to transmit a separate code pulse or signal to indicate the sign of the sample. Thus, if for example, it is necessary that there shall be a total of $2n$ quantised amplitude levels in order to produce the required quality of reproduction, if these levels can be divided into $n$ positive and $n$ negative levels, a coder can be used which deals with $n$ levels instead of $2n$ levels, and this saves one coding stage. An example is described in U.S. application, Serial No. 513,404 filed of even date herewith.

In a system of this kind it is essential that the sampling arrangement shall produce the samples of the signal wave amplitude with the proper magnitude whether they are positive or negative, and in particular there must be no tendency for a wandering of the zero sampling level, which would cause positive samples to be increased and negative samples to be decreased by the same amount (or vice versa). A consequence of this is that the sampling arrangement should produce no sample pulse when the signal wave amplitude is zero.

This accurate centering requirement of the sampling process is paricularly essential when amplitude compression is applied to the sample pulses, since otherwise sample pulses corresponding to equal positive and negative signal amplitudes will be compressed by different amounts and serious distortion will result.

The object of the present invention, therefore, is to provide a sampling arrangement in which accurate centering of the sample pulses is ensured, and in which the production of a sample pulse corresponding to a zero signal amplitude is substantially prevented.

This object is achieved according to the invention by providing an amplitude sampling arrangement for an electric pulse code modulation system of communication comprising means for applying a signal wave in opposite senses respectively to each of two conductors through a corresponding rectifier, means for applying a given bias potential to hold both the rectifiers normally blocked, and means for applying simultaneously to both the said rectifiers a gating pulse having an amplitude equal to the said bias potential in such manner as to render one only of the rectifiers capable of being unblocked by the signal wave potential applied thereto, whereby a sample pulse of a given sign and having an amplitude proportional to the said signal wave potential is applied to the corresponding conductor.

The invention will be described with reference to the accompanying drawings, in which:

Fig. 1 shows a block schematic circuit diagram of a transmitter for a multi-channel pulse code modulaion system to which the sampling process according to the invention is applied; and Fig. 2 shows circuit details of the sampling arrangement for one of the channels.

The transmitter shown in Fig. 1 is controlled by a master generator 56 which generates waves having a stabilised frequency of 2 megacycles per second. The waves from generator 56 are supplied to a timing generator 57 which includes conventional frequency dividing arrangements for producing two trains of short-positive rectangular timing pulses having a repetition frequency of 200 kilocycles per second and a duration of ½ microsecond. The two trains of timing pulses are phased in such manner that the pulses of one train occur substantially at the centres of the intervals between the pulses of the other train. One train of pulses, called the "A" pulses, is used to time the sampling of the odd-numbered channels, and is supplied to a conductor 58. The other train of pulses, called the "B" pulses, is used to time the sampling of the even-numbered channels and is supplied to conductor 59.

The "A" pulses are also supplied to control or synchronise a generator 62 of positive channel gating pulses, the repetition frequency of which is 8 kilocycles per second, and duration about 3 microseconds. These gating pulses are supplied to a delay network distributor 63 having tapping points spaced at intervals corresponding to 2½ microseconds, which tapping points are respectively connected to the individual channel units where the sampling takes place. The output circuit of the delay network 63 may be connected over a conductor 64 to synchronise the generator 62.

The periods of time allotted to each channel have a duration of 2½ microseconds, and the channel unit which is operative at any time is determined by the gating pulses from the delay network 63. This method of putting the channel units successively into operation is similar to that described in U.S. Patent No. 2,462,111.

Only four of the channel units are shown, designated 65 to 68, corresponding to channels 1 to 4 of the system. It will be understood that as many channel units as are required will be supplied. Each of the channel units is connected to a corresponding tapping point on the delay network 63, and the odd numbered channel units 65, 67, etc. are supplied with the A pulses from conductor 58, and the even numbered channel units 66, 68, etc. are supplied with the B pulses from conductor 59. The signal waves to be transmitted are supplied to the respective channel units 65 to 68 etc. through input terminals 75 to 78 etc.

One of the odd-numbered channel units of the system is replaced by a synchronising unit 69 controlled by the A pulses from conductor 58 and by the gating pulses from a corresponding tapping point on the delay network 63. The unit 69 generates a synchronising pulse or signal of some suitable distinctive form which can be isolated at the receiving end of the system (not shown) and used to control the channel selection thereat in a known manner.

A direct-current bias source 85 is provided. This supplies two stabilised positive bias potentials $E_1$ and $E_2$ over conductors 86 and 87 controlling the channel units in a manner which will be explained later.

Each channel unit has a pair of output conductors, designated 89 and 90 for the channel unit 65. The two output conductors of all the odd-numbered channel units are connected to a buffer amplifier 95, and the two output conductors from all the even-numbered channel units are connected to a second similar buffer amplifier 99. As will be explained more fully later, a positive sample pulse appears on conductor 89 if the signal amplitude at the time of sampling is positive, while a positive sample pulse appears on conductor 90 if the corresponding signal amplitude is negative. The amplitude of each positive sample pulse is proportional to the corresponding signal amplitude in each case.

The buffer amplifiers 95 and 99 are connected to corresponding similar coders 97 and 100, and are also supplied with the bias potential $E_1$ from the source 85. Each buffer amplifier has two output conductors designated 96 and 98 in the case of buffer amplifier 95. Over conductor 96 is delivered a positive preliminary pulse only if the corresponding signal amplitude is negative. This preliminary pulse causes the suppression of a digit pulse in the coder 97, this digit pulse being called the "initial digit pulse." Its presence indicates that the signal amplitude represented by the code group of digit pulses which immediately follows is positive. Over conductor 98 is delivered a positive sample pulse corresponding to either a positive or a negative signal amplitude, and this sample pulse is translated at the code group in the coder 97. Details of this coding arrangement are not required for an understanding of the present invention, and will be found described in the specification of co-pending application No. 513,404.

The elements 99 and 100 are exactly similar to elements 95 and 97 respectively, and the code groups of digit pulses from the coders 97 and 100 are supplied to a mixer circuit 81, together with the synchronising signals from the unit 69. The combined pulses at the output of the mixer 81 are supplied to a radio transmitter 82 and radiated by an antenna 83.

Details of the channel unit 65 and the buffer amplifier 95 are shown in Fig. 2. The buffer amplifier 99 is exactly the same as 95, and all the channel units are the same as channel unit 65, except that the even-numbered channel units are controlled by the B pulses instead of by the A pulses. In the channel unit 65, the terminal 75 for the signal wave to be coded is connected through a blocking capacitor 103 to a linear amplifier 104, the output of which is connected to the primary winding of the transformer 105, the secondary winding of which is provided with a centre tap. A gating amplifier 106 is provided, to which are supplied the gating pulses from the delay network 63 (Fig. 1) over conductor 107 and the A timing pulses over conductor 58. Conductors 58 and 107 are connected to the gating amplifier 106 through blocking capacitors 108 and 109. The gating amplifier 106 is a conventional arrangement which produces a positive rectangular gating pulse of duration ½ microsecond across the earthed resistor 110 only when one of the A pulses applied over conductor 58 synchronises with one of the gating pulses applied over conductor 107. A rectifier 111 is connected through blocking capacitors 112 and 113 across the resistor 110. The lower terminal of the rectifier 111 is connected to the bias source 85 over conductor 86. The bias source supplies a fixed bias voltage $+E_1$ to the rectifier 111, which is directed so that it will normally be blocked by this bias voltage. The purpose of this arrangement is to limit rigidly the amplitude of the gating pulse generated by the gating amplifier 106 across the resistor 110 to $E_1$ for a reason which will be explained later. It will be seen that if the gating pulse voltage tends to exceed $E_1$, the rectifier 111 will be unblocked and will prevent any increase of the gating pulse voltage above $E_1$.

The terminals of the secondary winding of the transformer 105 is connected respectively to the output conductors 89 and 90 through rectifiers 114 and 115 directed to pass positive pulses to these conductors. Two further oppositely directed rectifiers 116 and 117 are connected in series across the transformer 105, and the common point of these rectifiers is connected through an inductor 118 to the output conductor 87 of the bias source 85, which supplies a fixed bias voltage $+E_2$ to this conductor. The rectifiers 116 and 117 are directed to be blocked in this condition. The gating pulse which appears across resistor 110 is also supplied across the inductor 118 through blocking capacitors 119 and 120. A rectifier 121 shunted by a resistor 122 connects the junction point of the capacitors 112 and 119 to ground and is directed to suppress any negative pulses which may be produced by the inductor 118.

The conductors 89 and 90 are also shunted by two equal inductors 123 and 124, connected in series, which are shown as part of the buffer amplifier 95 because they are shared in common by all the channel units of the group, though from their function they really form part of the channel unit circuit. The junction point of the inductors 123 and 124 is connected to the output conductor 86 of the bias source 85, and this junction point is therefore supplied with a bias potential $+E_1$ which is equal to the maximum limited amplitude of the gating pulses from the gating amplifier 106. The inductors 123 and 124 are respectively shunted by two oppositely directed rectifiers 125 and 126 which are directed to suppress any negative pulses which may be generated in these inductors and applied to the conductors 89 and 90.

The channel unit 65 operates in the following manner. It will first be assumed that the signal wave-amplitude applied at terminal 75 is zero. Before the appearance of the gating pulse at the output of the amplifier 106, the rectifiers 114 and 115 will be blocked by the bias potential $+E_1$ supplied from conductor 86 through the inductors 123 and 124, and the rectifiers 116 and 117 will be blocked by the bias potential $+E_2$ supplied from conductor 87 through inductor 118. When the gating pulse appears across resistor 110, it will raise the potential of the terminals of the secondary winding of the transformer 105 just to $+E_1$ so that the rectifiers 114 and 115 just fail to be unblocked and no pulse will be supplied to either conductor 89 or 90. At the same time, the gating pulse voltage $+E_1$ is developed across the inductor 118, thus raising the potential applied to the junction point of rectifiers 116 and 117 to $E_1+E_2$. These rectifiers therefore remain blocked.

Now suppose that at the time of the gating pulse the voltage amplitude of the signal wave applied to terminal 75 has some positive value, say $+e_0$. This voltage will be amplified by the linear amplifier 104 and it will be assumed that the transformer 105 is so connected that a positive voltage $+e$ is obtained in consequence at the left terminal of the secondary winding. At the same time an equal negative potential $-e$ will appear at the right terminal of this winding. It follows that the rectifier 114 will now be unblocked and a positive sample pulse of amplitude $+e$ and duration ½ microsecond will be delivered to conductor 89. The negative potential $-e$ appearing at the lower terminal of the secondary winding of the transformer 105 will block the rectifier 115, and no pulse will be delivered to conductor 90.

It will be evident that if the amplitude of the signal wave applied to terminal 75 is negative instead of positive, a positive sample pulse of amplitude $+e$ and duration ½ microsecond will be delivered to conductor 90 instead of to conductor 89.

It will be clear that since the bias potential applied to the rectifiers 116 and 117 in the presence of the gating pulse at the output of the amplifier 106 is $E_1+E_2$, the rectifier 116 or 117 will be held blocked until the sample pulse amplitude $e$ exceeds $E_2$. The sample pulse amplitude is thus limited to $E_2$, and the bias voltage $E_2$ will therefore be chosen to be equal to the maximum range of amplitude values to be coded.

The buffer amplifier 95 shown in Fig. 2 comprises, in addition to the elements 123 to 126 already mentioned, two similar valves 127 and 128, the anodes of which are connected directly to the positive high tension terminal 4. The cathodes are connected to ground through equal resistors 130 and 131, and also through rectifiers 132 and 133 and a common resistor 134. The control grids are connected to ground through leak resistors 135 and 136 shunted respectively by rectifiers 137 and 138 directed to prevent the potential of the control grids from becoming negative. The conductors 89 and 90 from the channel units are respectively connected to the control grids of the valves 127 and 128 through blocking capacitors 139 and 140. The output conductors 96 and 98 which lead to the coder 97 (Fig. 1) are connected respectively to the cathode of the valve 128 and to the junction point of rectifiers 132 and 133 through capacitors 141 and 142.

The valves 127 and 128 should be biased to operate as linear cathode follower amplifiers so that there will be delivered to conductor 98 a positive pulse of amplitude substantially equal to $e$ in response to a positive sample pulse of amplitude $e$ applied from any channel unit to either conductor 89 or 90. The rectifiers 132 and 133 are directed to pass positive pulses from the cathodes to the resistor 134, and isolate the cathodes from one another so that when a sample pulse is delivered from the cathode of valve 127, rectifier 133 will be blocked, and vice versa.

It will be noted, however, that a positive output pulse will be delivered to conductor 96 only if the input sample pulse occurs on conductor 90, corresponding to a negative amplitude. As already explained, this output pulse is applied in the coder 97 to suppress the initial digit pulse when the corresponding signal wave amplitude is negative.

It will be seen that a positive sample pulse having an amplitude which is proportioned to the signal wave amplitude at the time of sampling is delivered to the output conductor 98 and thence to the coder 97 (Fig. 1) whatever the sign of the signal wave amplitude. Furthermore, a positive pulse is delivered to conductor 96 only in response to negative signal wave amplitudes. These results are obtained principally by means of the rectifiers 114 and 115 which are normally held blocked by the bias potential $+E_1$ supplied through inductors 123 and 124, and are so arranged that the gating pulse supplied from the amplifier 106 renders either of them capable of being unblocked by a positive signal potential from transformer 105, without the production of any output pulse when the signal wave amplitude is zero. The rectifiers 116 and 117 which are provided with the initial bias $+E_2$ from conductor 87 are used to limit the signal wave amplitude so that it cannot exceed the maximum range for which the coder is designed.

It will be understood that the particular frequency and other values suggested above in order to make the explanation clear are not essential to the invention, and may be changed as circumstances require. Also it is not essential that the sample pulses delivered to conductors 89 and 90 should be positive. They could be negative if desired, provided that the rectifiers and bias voltages are reversed. Various other obvious modifications will be evident to those skilled in the art.

While the principles of the invention have been described above in connection with specific embodiments, and particular modifications thereof, it is to be clearly understood that this description is made only by way of example and not as a limitation on the scope of the invention.

What I claim is:

1. An amplitude sampling arrangement for an electric pulse code modulation system of communication comprising two conductors, similarly poled rectifiers in series with said conductors, means for applying alternately the positive and negative potentials of a signal wave to each of said rectifiers, means for applying a given bias potential to said rectifiers to hold both the rectifiers normally blocked, and means for applying simultaneously to both the said rectifiers, a gating pulse having an amplitude substantially equal to the said bias potential to render one only of the rectifiers capable of being unblocked by the signal wave potential applied thereto, whereby a sample pulse of a given sign and having an amplitude proportional to the said signal wave potential and a duration substantially equal to said gating pulse is applied to the conductor connected to that rectifier capable of being unblocked.

2. An arrangement according to claim 1 in which the means for applying comprises a transformer having a secondary winding with a center tap, the said rectifiers being connected respectively to the ends of the said secondary winding, means for applying said signal wave to the primary of said transformer, two inductors connected in series between the said conductors, means for applying said bias potential to the junction point of said inductors, and means for applying gating pulses to the said center tap.

3. An arrangement according to claim 2, further comprising means for limiting the amplitude of the said sample pulse.

4. An arrangement according to claim 3, in which the means for limiting comprises two additional oppositely directed rectifiers connected in series across the said secondary winding, means for applying a given bias potential to the junction point of the two additional rectifiers to hold them normally blocked and means for applying the gating pulse to the junction point to effectively increase the bias potential which blocks the additional rectifiers.

5. An arrangement according to claim 1, further comprising a third conductor, and means for delivering an output pulse to the said third conductor only in response to a sample pulse appearing on a specified one of the two first-mentioned conductors.

6. An arrangement according to claim 1, further comprising two similar amplifiers, a common output load circuit for said amplifier, means connecting said conductors with respective ones of said amplifiers and means for deriving an output pulse from the said load circuit in response to a sample pulse appearing on either of the said conductors.

7. An arrangement according to claim 6, further comprising means for deriving a second output pulse from one of the amplifiers only when a sample pulse appears on a specified one of the said conductors.

8. An arrangement according to claim 1, further comprising two similar valves each having grid electrodes and being arranged as cathode follower amplifiers, means to couple said conductors with respective grid electrodes of said tubes, a common load resistor for said amplifiers, oppositely poled isolating rectifiers connected between the respective cathodes and said common load resistor, means for deriving a first output pulse from the said load resistor in response to a sample pulse which appears on either of the said conductors, and means for deriving directly from the cathode of one of the valves a second output pulse in response to a sample pulse which appears only on a specified one of the said conductors.

References Cited in the file of this patent

UNITED STATES PATENTS

| | | |
|---|---|---|
| 2,267,120 | Mathes | Dec. 23, 1941 |
| 2,443,195 | Pensyl | June 15, 1948 |
| 2,498,678 | Grieg | Feb. 28, 1950 |
| 2,504,354 | Roschke | Apr. 18, 1950 |
| 2,710,348 | Baum et al. | June 7, 1955 |
| 2,716,732 | Garner et al. | Aug. 30, 1955 |
| 2,810,885 | Davis et al. | Oct. 22, 1957 |
| 2,841,719 | Radcliffe | July 1, 1958 |

FOREIGN PATENTS

| | | |
|---|---|---|
| 703,247 | Great Britain | Feb. 3, 1954 |